United States Patent
Wang et al.

(10) Patent No.: US 10,119,468 B2
(45) Date of Patent: Nov. 6, 2018

(54) CUSTOMER BLEED AIR PRESSURE LOSS REDUCTION

(75) Inventors: Cheng-Zhang Wang, Glastonbury, CT (US); Thomas G. Phillips, Coventry, CT (US); David F. Cloud, Simsbury, CT (US); Peter M. Munsell, Granby, CT (US)

(73) Assignee: United Technologies Corporation, Farmington, CT (US)

(*) Notice: Subject to any disclaimer, the term of this patent is extended or adjusted under 35 U.S.C. 154(b) by 1819 days.

(21) Appl. No.: 13/366,597

(22) Filed: Feb. 6, 2012

(65) Prior Publication Data
US 2013/0199205 A1    Aug. 8, 2013

(51) Int. Cl.
| | |
|---|---|
| *F02C 6/08* | (2006.01) |
| *F01D 9/02* | (2006.01) |
| *F01D 9/06* | (2006.01) |
| *F02C 7/18* | (2006.01) |
| *F02C 9/18* | (2006.01) |

(52) U.S. Cl.
CPC ............... *F02C 6/08* (2013.01); *F01D 9/023* (2013.01); *F01D 9/065* (2013.01); *F02C 7/185* (2013.01); *F02C 9/18* (2013.01); *F05D 2260/601* (2013.01); *F05D 2270/17* (2013.01); *F05D 2270/301* (2013.01); *Y02T 50/675* (2013.01)

(58) Field of Classification Search
CPC ...... F02C 6/04; F02C 6/06; F02C 6/08; F02C 7/18; F02C 7/047; F02C 9/18; F01D 25/24; F01D 25/08; F01D 25/12; F01D 9/065

USPC .......................................... 60/751, 782, 785
See application file for complete search history.

(56) References Cited

U.S. PATENT DOCUMENTS

| | | | | |
|---|---|---|---|---|
| 3,318,097 | A | * | 5/1967 | Wood et al. ..................... 60/262 |
| 3,441,045 | A | | 4/1969 | Malone |
| 4,080,409 | A | | 3/1978 | Graybill |
| 4,711,084 | A | | 12/1987 | Brockett |
| 4,765,131 | A | | 8/1988 | Benson |
| 4,870,826 | A | | 10/1989 | Daguet et al. |
| 4,979,587 | A | * | 12/1990 | Hirt et al. ..................... 181/213 |
| 5,155,991 | A | | 10/1992 | Bruun |
| 5,211,003 | A | * | 5/1993 | Samuel ........................... 60/772 |
| 5,287,694 | A | * | 2/1994 | Davis et al. .................... 60/785 |
| 5,351,478 | A | * | 10/1994 | Walker et al. ................. 60/785 |
| 5,575,144 | A | | 11/1996 | Brough |
| 5,581,996 | A | * | 12/1996 | Koch et al. ..................... 60/782 |

(Continued)

OTHER PUBLICATIONS

International Search Report and Written Opinion PCT/US2013/024697 completed May 13, 2013.

(Continued)

*Primary Examiner* — Andrew Nguyen
(74) *Attorney, Agent, or Firm* — Carolson, Gaskey & Olds, P.C.

(57) ABSTRACT

A bleed air supply system for a gas turbine engine comprising a duct having an inlet end and extending to an outlet end. The inlet end of the duct is provided with a central insert. In another feature, there may be a plurality of ducts, and inlet ends of the plurality of ducts being spaced by at least 90°. In another feature, a compressor may have a diffuser with a shroud ending upstream of the downstream end of an inner shroud, having an outer shroud ending at a location upstream of a downstream end of an inner shroud at locations circumferentially aligned with an inlet end of the duct.

10 Claims, 7 Drawing Sheets

(56) References Cited

U.S. PATENT DOCUMENTS

| | | | |
|---|---|---|---|
| 6,325,595 B1 | 12/2001 | Breeze-Stringfellow et al. | |
| 6,327,844 B1* | 12/2001 | Kaminske | 60/782 |
| 7,197,881 B2 | 4/2007 | Winstanley | |
| 2006/0277919 A1* | 12/2006 | Martensson | F02C 3/13 60/785 |
| 2009/0000307 A1* | 1/2009 | Tatebayashi | 60/785 |
| 2010/0013242 A1 | 1/2010 | Schwarz et al. | |
| 2010/0031627 A1* | 2/2010 | Vontell | F02C 7/047 60/226.1 |
| 2010/0115963 A1* | 5/2010 | Kirby | 60/785 |
| 2011/0138819 A1 | 6/2011 | Tanimura | |
| 2011/0192170 A1 | 8/2011 | Dooley et al. | |

OTHER PUBLICATIONS

International Preliminary Report on Patentability for PCT/US2013/024697 dated Aug. 21, 2014.
Supplementary European Search Report for European Application No. 13747274.2 completed Sep. 21, 2015.

\* cited by examiner

CUSTOMER BLEED AIR PRESSURE LOSS REDUCTION

BACKGROUND OF THE INVENTION

This application relates to a system for reducing pressure loss on bleed air systems for tapping air away from a gas turbine engine for use on an associated aircraft.

Gas turbine engines for use on aircraft typically include a fan delivering air into a compressor. Air from the compressor is directed into a combustion section where it is mixed with fuel and burned. Products of this combustion pass downstream over turbine rotors, causing them to rotate and power the fan and compressor rotors.

When gas turbine engines are utilized on aircraft, they are also the source of air for various uses on the aircraft. As examples, cabin air, cooling air, or air for any number of other applications are tapped from the gas turbine engine.

Typically, air that has been at least partially compressed is utilized. In many applications, the air is initially taken from a port downstream of the entire compressor section, and upstream of the combustion section. The air is taken from this high pressure port when the engine is at low thrust. As thrust increases, the pressure at this port will rise until a high pressure shutoff valve closes. Thereafter, air is tapped from a port at an intermediate location in the compressor section.

The pressure loss near the ports raises challenges with regard to providing sufficient air without decreasing the efficiency of the associated aircraft.

SUMMARY OF THE INVENTION

In a featured embodiment, a bleed air supply system for a gas turbine engine has a duct having an inlet end and extending to an outlet end. An inlet end of the duct is provided with a central insert at an upstream end. The insert ends within the duct upstream of the outlet end.

In another embodiment according to the foregoing embodiment, the central insert provides a venturi effect by reducing the cross-sectional flow area between the insert and an inner wall of the duct of the upstream end. The insert and duct provide increased cross-sectional flow areas at downstream locations.

In another embodiment according to the foregoing embodiment, the insert has rounded axial ends.

In another embodiment according to the foregoing embodiment, the air supply system includes a plurality of ducts, each being provided with an insert. The ducts have inlet ends at locations spaced by at least 90° about a cross-sectional center axis of a gas turbine engine which is to receive the air supply system.

In another embodiment according to the foregoing embodiment, the inlet ends are spaced by 180°.

In another embodiment according to the foregoing embodiment, a plurality of insert holders center the insert within the duct.

In another featured embodiment, a gas turbine engine has a compressor delivering air into a combustion section. The combustion section and the compressor are housed in a housing. An air supply system communicates through the housing to deliver air from a location between an upstream end of the compressor, and an upstream end of the combustor. The air supply system has a duct with an inlet end extending to an outlet end. The duct is provided with a central insert at an upstream end, ending within the duct upstream of the outlet end.

In another embodiment according to the foregoing embodiment, the central insert provides a venturi effect by reducing the cross-sectional flow between the insert and an inner wall of the duct at the upstream end. The insert and duct provide increased cross-sectional flow areas at downstream locations.

In another embodiment according to the foregoing embodiment, the insert has rounded axial ends.

In another embodiment according to the foregoing embodiment, the air supply system includes a plurality of ducts. Each of the ducts have inlet ends at locations spaced by at least 90° about a cross-sectional center axis of the gas turbine engine.

In another embodiment according to the foregoing embodiment, the inlet ends are spaced by 180°.

In another embodiment according to the foregoing embodiment, a plurality of insert holders center the insert within the duct.

In another embodiment according to the foregoing embodiment, a diffuser is positioned downstream of the compressor. An opening in the housing supplies air to the inlet end. The diffuser has an outer shroud and an inner shroud with intermediate vanes. The outer shroud ends at a location upstream of a downstream end of the inner shroud at locations circumferentially aligned with the inlet end.

In another embodiment according to the foregoing embodiment, the outer shroud only ends at the upstream location at circumferential locations associated with the inlet end, but extends further downstream at other locations.

In another embodiment according to the foregoing embodiment, a flow path extends through the opening, and into the inlet end of the duct which has at least a portion formed with a part-circular radius.

In another embodiment according to the foregoing embodiment, the opening in the housing leads into the inlet end of the duct, with an inlet end ending downstream of the opening in the housing, with the part-circular radius portion formed in the housing.

In another embodiment according to the foregoing embodiment, an opening is formed through the housing and into the inlet end of the duct wherein a flow path extends through the opening, and into the inlet end of the duct which has at least a portion formed with a part-circular radius.

In another embodiment according to the foregoing embodiment, the opening in the housing leads into the inlet end of the duct. The inlet end ends downstream of the opening in the housing, with the part-circular radius portion formed in the housing.

In another featured embodiment, a gas turbine engine has a compressor delivering air into a combustion section. The combustion section and compressor are housed in a housing. An air supply system communicates through the housing to deliver air from a location between an upstream end of the compressor, and an upstream end of the combustor. The air supply system has a duct with an inlet end extending to an outlet end. The duct is provided with a central insert at an upstream end. The central insert provides a venturi effect by reducing the cross-sectional flow between the insert and an inner wall of the duct at the upstream end. The insert and duct provide increased cross-sectional flow areas at downstream locations. The insert ends within the duct upstream of the outlet end. The air supply system includes a plurality of ducts, each being provided with an insert. The ducts inlet ends at locations spaced by at least 90° about a cross-sectional center axis of the gas turbine engine. A diffuser is positioned downstream of the compressor with an opening in the housing supplying air to the inlet end. The diffuser has an outer shroud and an inner shroud with intermediate vanes. The outer shroud ends at a location upstream of a downstream end of the inner shroud at locations circumferentially aligned with the inlet end. The outer shroud only ends at the upstream location at circumferential locations associated with the inlet end, but extends further downstream at other locations. A flow path extends through the opening, and into the inlet end of the duct which has at least a portion formed with a part-circular radius.

In another featured embodiment, a gas turbine engine has a compressor delivering air into a combustion section. The combustion section and compressor are housed in a housing. An air supply system communicates through the housing to deliver air from a location between an upstream end of the compressor and an upstream end of the combustor. The air supply system has a plurality of ducts to move air towards a use. The ducts have inlet ends at locations spaced by at least 90° about a cross-sectional center axis of the gas turbine engine.

In another featured embodiment, a gas turbine engine has a compressor delivering air into a combustion section. The combustion section and compressor are housed in a housing. An air supply system communicates through the housing to deliver air from a location between an upstream end of the compressor, and an upstream end of the combustor. The air supply system has a duct with an inlet end. A diffuser is positioned downstream of the compressor, and has an outer shroud and an inner shroud with intermediate vanes. The outer shroud ends at a location upstream of the downstream end of the inner shroud at locations circumferentially aligned with the inlet end.

In another embodiment according to the foregoing embodiment, the outer shroud only ends at the upstream location at circumferential locations associated with the inlet ends, but extends further downstream at other locations.

DETAILED DESCRIPTION

Figure 1:
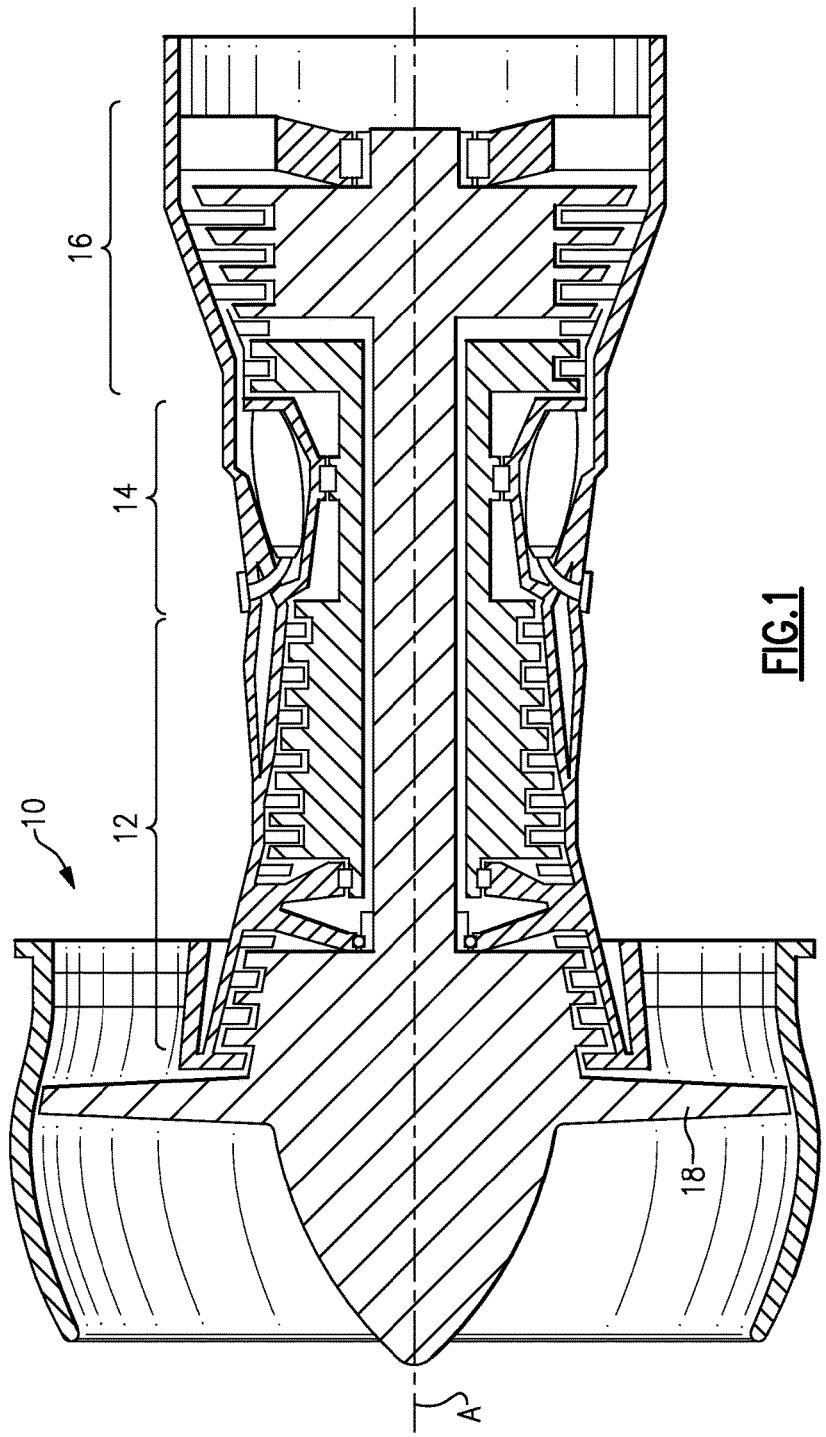
FIG. 1 shows a prior art gas turbine engine.

FIG. 1 shows a prior art gas turbine engine. A gas turbine engine 10, such as a turbofan gas turbine engine, circumferentially disposed about an engine centerline A, is shown in FIG. 1. The engine 10 includes a fan 18, a compressor 12, a combustion section 14 and turbine sections 16. As is well known in the art, air compressed in the compressor 12 is mixed with fuel which is burned in the combustion section 14 and expanded across turbines 16. The turbines includes rotors that rotate in response to the expansion, driving compressor rotors and fan 18. This structure is shown somewhat schematically in FIG. 1. While one example gas turbine engine is illustrated, it should be understood this invention extends to any other type gas turbine engine for any application.

Figure 2A:
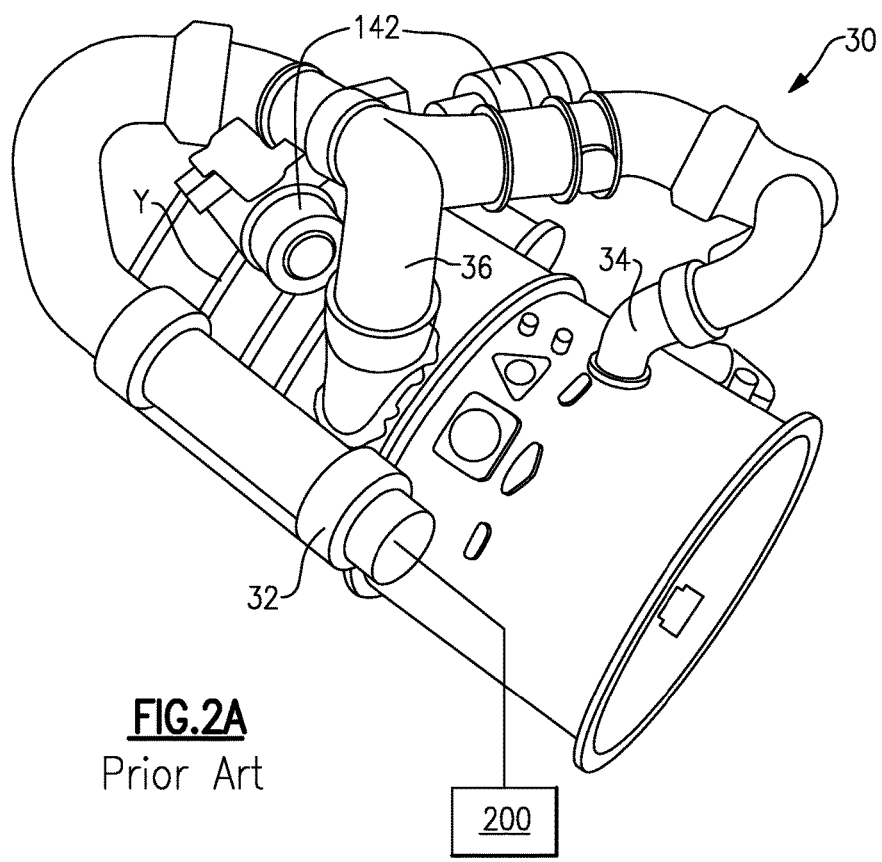
FIG. 2A shows a prior art air bleed arrangement.

FIG. 2A shows a bleed air arrangement 30. As shown, there is a downstream tap port 34 which is associated with a location downstream of the compressor section 12, but upstream of the combustor 14 (see FIG. 3). At low thrust application, air is tapped through port 34, and delivered to an outlet 32, which communicates with various uses 200 for air on the aircraft. As thrust increases, valves 142 shut off the flow from the port 34, and switch to a port 36 which is upstream of the port 34, and at an intermediate location in the compressor section 12.

Figure 2B:
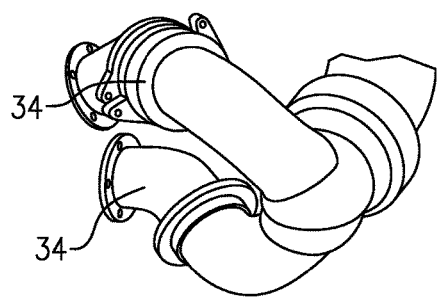
FIG. 2B shows a portion of the FIG. 2A arrangement.

FIG. 2B shows that there are actually two of the ports 34 in a typical prior art arrangement which are spaced circumferentially about a central line of the engine. In the prior art, the ports 34 are spaced by a relatively small angle, and typically on the order of 25° to 30°.

Figure 3:
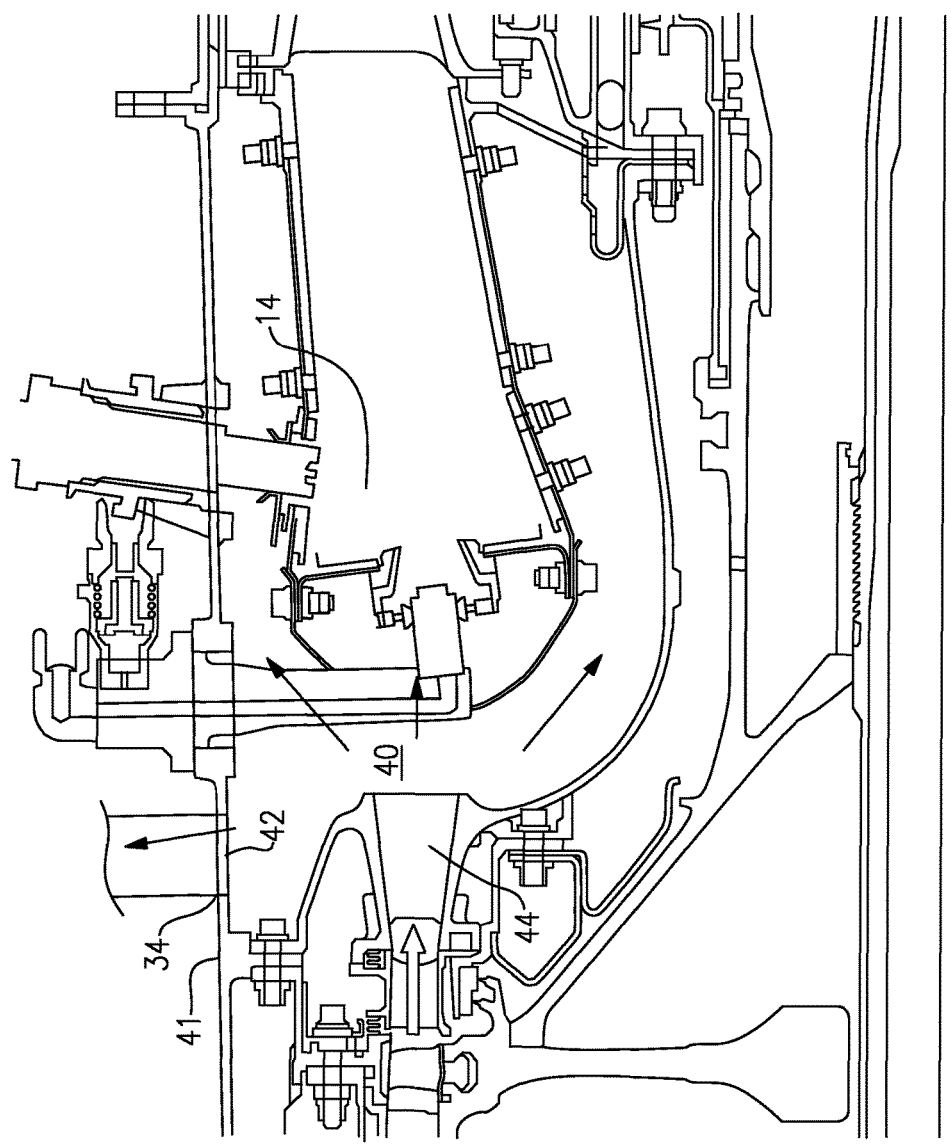
FIG. 3 shows the location of one part of the prior art arrangement.

FIG. 3 shows the location of the port 34, associated with a location 40 downstream of a diffuser 44, which is the downstream end of compressor section 12. As shown, an opening 42 in a housing 41 communicates air into the duct port. Downstream of the area 40 is the combustor 14.

Figure 4:
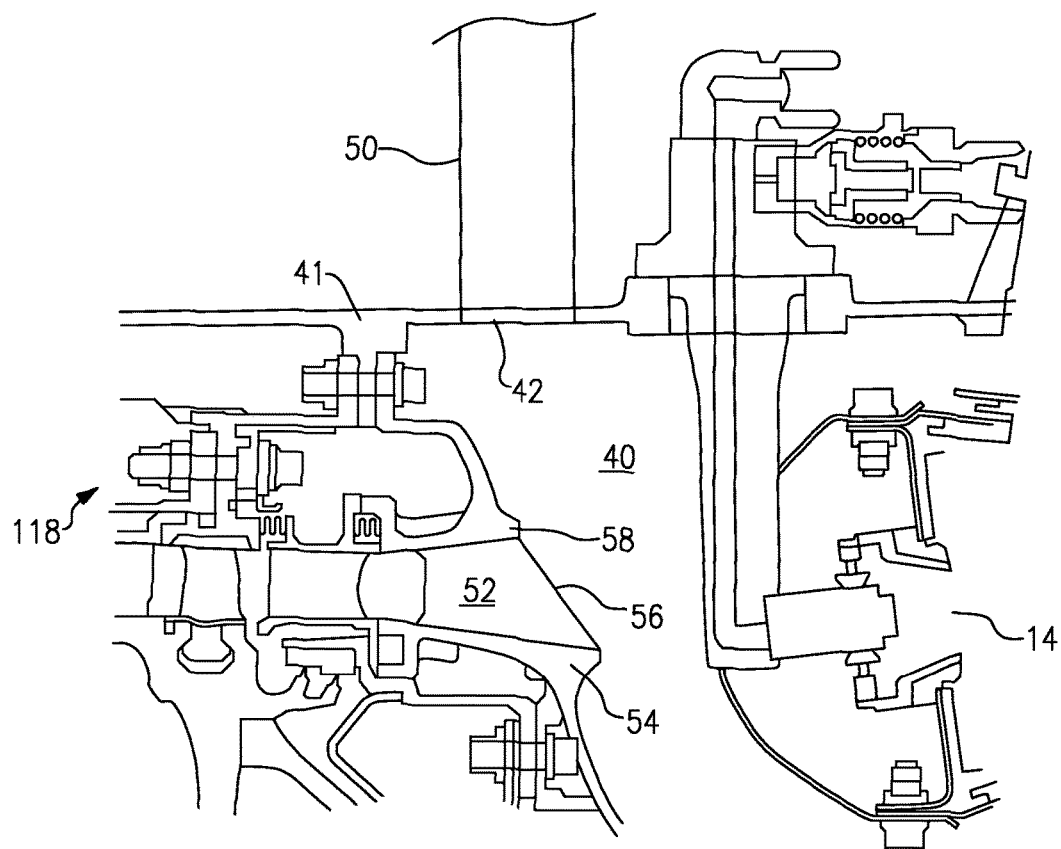
FIG. 4 shows a tap location in the present application.

FIG. 4 shows a diffuser embodiment 118 wherein an outer shroud 58 of the diffuser ends upstream of a radially inner shroud 54. As shown, vanes 56 extend between the shroud walls 54 and 58.

The duct 50 communicates with an opening 42. Further details of this duct will be disclosed below.

Figure 5:
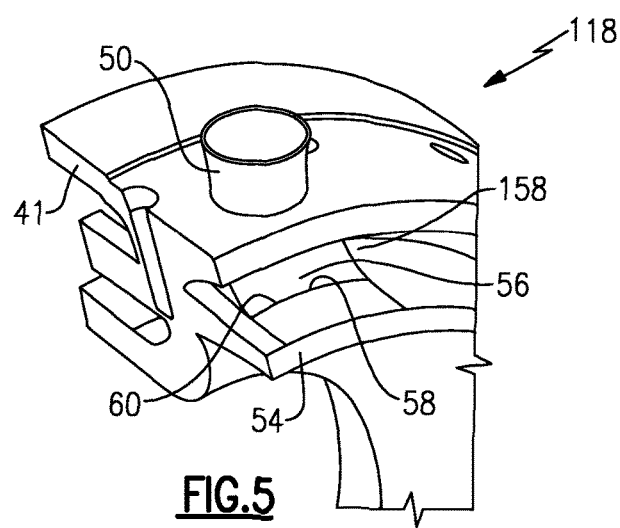
FIG. 5 shows detail of a diffuser incorporated into this application.

FIG. 5 shows a portion of the diffuser 118. As shown, the outer shroud is cut upstream, at locations 58 associated with the opening 42, but otherwise extends forwardly 158 to the location of the prior art diffuser as shown, for example, in FIG. 3. In embodiments, there are plural ducts 50 and openings 42, and the cutaway locations 58 are associated with each opening 42.

Cutting away the diffuser at the areas 58 associated with the opening 42 dramatically reduces pressure loss.

Figure 6A:
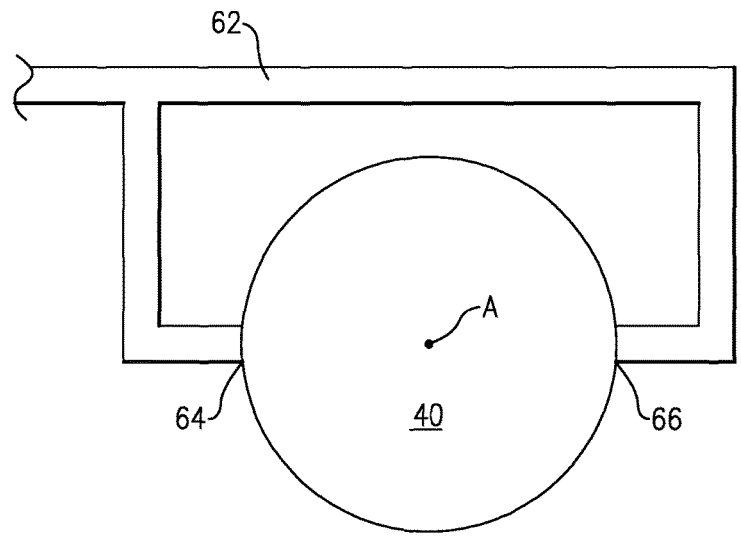
FIG. 6A shows a first embodiment arrangement of ports.

FIG. 6A shows an arrangement wherein the ports 64 and 66 communicate with a common conduit 62, which then communicates downstream to various uses for air on the aircraft. Ports 64 and 66 are spaced by approximately 180° about a centerline X.

Applicant has discovered that by increasing the distance between the ports, the pressure loss across the system is dramatically reduced.

Figure 6B:
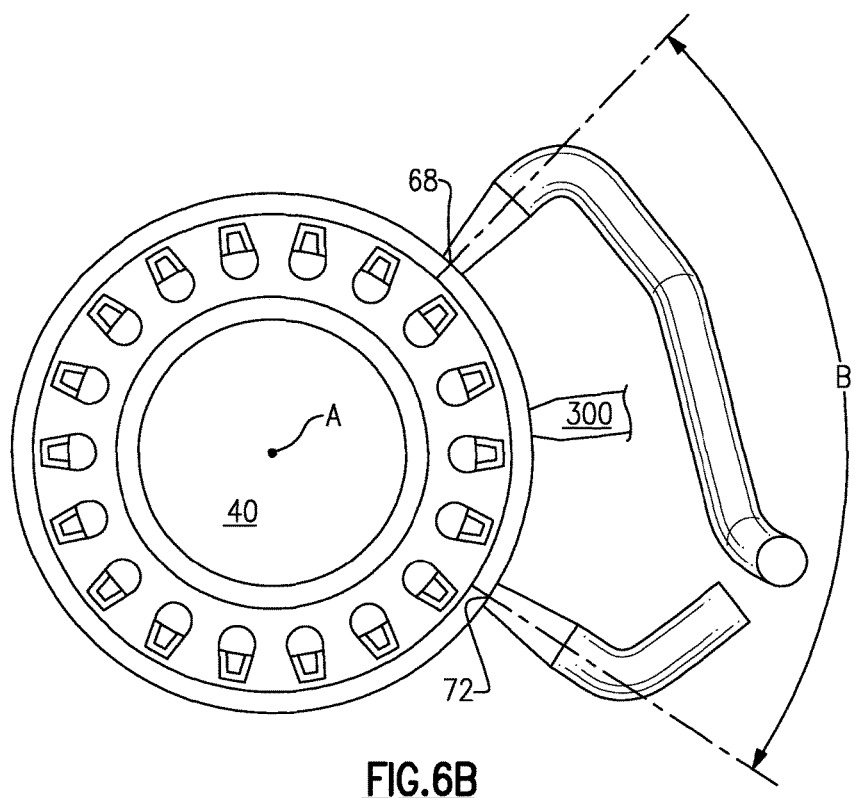
FIG. 6B shows a second embodiment arrangement of ports.

FIG. 6B shows an alternative arrangement wherein there are ports 68 and 72. The ports 68 and 72 are spaced by an angle B, which in this embodiment would be approximately 90°. In embodiments, it is preferred that the ports are spaced by at least 90° to minimize pressure loss.

As shown schematically at 300, there could be a third port incorporated at a smaller angle. While the use of ports spaced by at least 90° is a feature of this combination, it should be clear from the FIG. 6B, that the other features of this application could be utilized in a system wherein the ports are spaced closer, such as shown by 300 in FIG. 6B, or as shown in FIG. 2B.

Figure 7A:
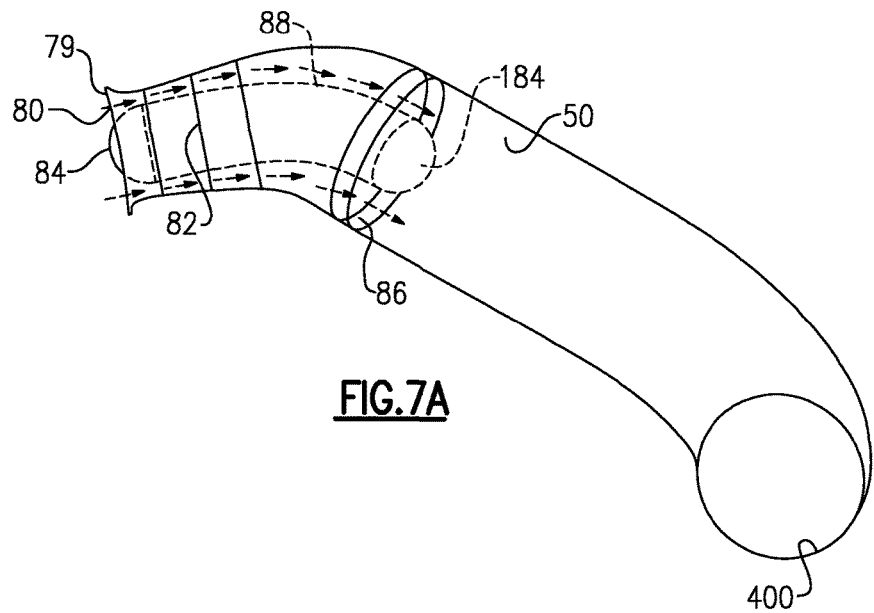
FIG. 7A shows a feature of a venturi duct.

FIG. 7A shows a duct 50 which includes an insert 82 at an upstream end 79. As shown, the insert 82 creates a venturi with a relatively small cross-sectional flow 80 at the upstream end, and increasing to a larger flow 86. Ends of the insert 84 and 184 are spherical to reduce pressure losses associated with air flowing along those surfaces.

A feature provided by the insert, is that flow separation will be prevented since the flow would be through an annular area between the insert and the inner wall of the duct. This and the venturi effect result in the reduced pressure losses.

Figure 7B:
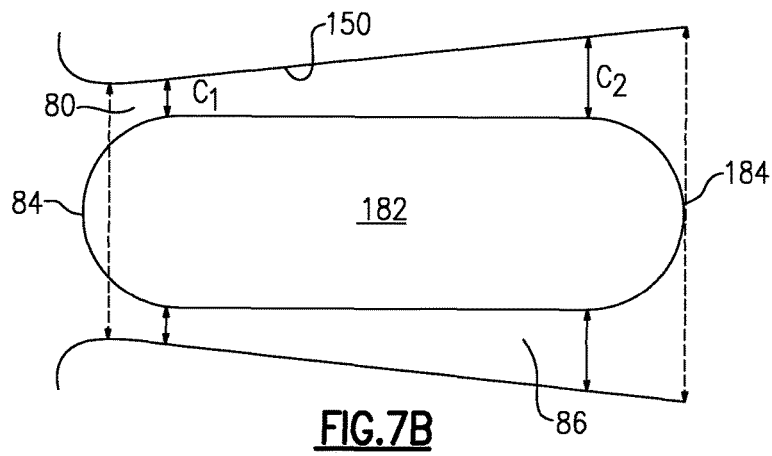
FIG. 7B shows an alternative embodiment.

FIG. 7B shows the use of the insert 182 in a somewhat alternative duct embodiment 150. As can be seen from FIG. 7A, the insert and duct in the FIG. 7A embodiment bend at 88, while the FIG. 7B embodiment extends generally linearly.

As shown in FIG. 7B, an upstream flow cross-sectional area $A_1$ defined between the outer periphery of the insert 182 and the inner periphery of the duct 150 is much smaller than a downstream cross-sectional flow area $A_2$ again defined between the insert and the inner wall of the duct. This creates a venturi effect.

As can be seen from the FIGS. 7A and 7B, the insert ends at an intermediate location within the ducts 50 or 150, and will end before the outlet 400 of the duct 50, which communicates into other portions of the air supply system.

Figure 7C:
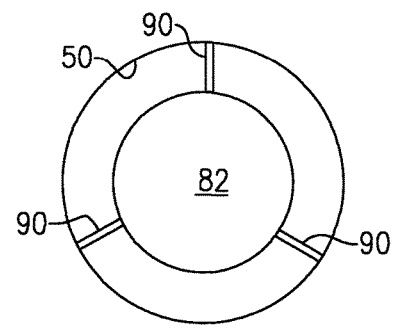
FIG. 7C shows another feature of the FIGS. 7A and 7B embodiments.

FIG. 7C shows features of the FIG. 7A or 7B embodiments wherein insert holders 90 mount the insert within the duct 50. In this embodiment there are three insert holders, each spaced by 120°.

Figure 8:
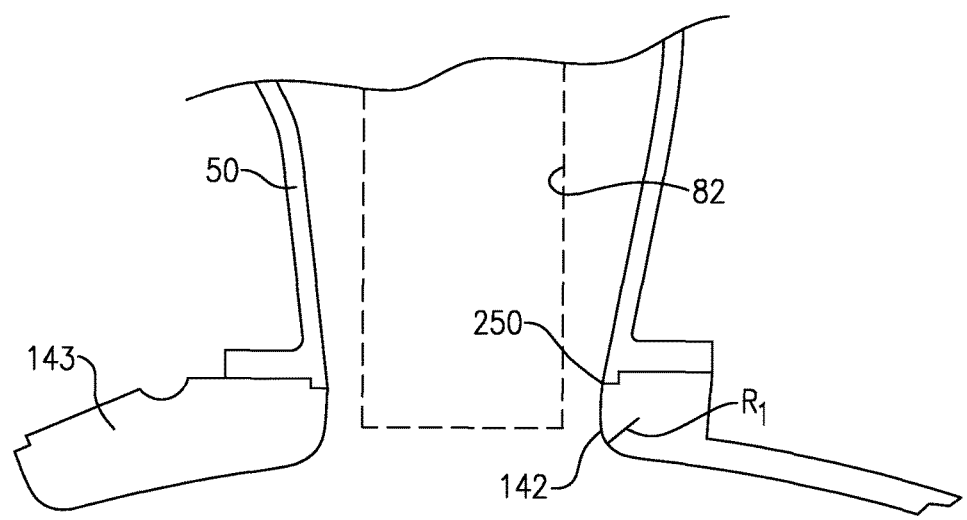
FIG. 8 shows yet another feature.

FIG. 8 shows another feature wherein duct 50 ends at an upstream end 250. The opening 142 in the housing 143 has a lead in radius $R_1$ communicating into the duct 50. The radius $R_1$ may be 0.25" (0.6 cm) in one embodiment. Of course, other radii may be used. By having a part circular radius leading into the duct, the pressure losses are also reduced.

The combination of features dramatically reduces pressure loss, and provides a more efficient system for delivering bleed air.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
a compressor delivering air into a combustion section having a combustor, and said combustion section and said compressor being housed in a housing, an air supply system communicating through said housing to deliver air from a location between an upstream end of said compressor, and an upstream end of said combustor;
said air supply system having a duct with an inlet end and extending to an outlet end, said duct being provided with a central insert at an upstream end, said insert ending within said duct upstream of said outlet end;
said central insert providing a venturi effect by reducing a cross-sectional flow area between the insert and an inner wall of the duct at the upstream end, and said insert and duct providing increased cross-sectional flow areas at downstream locations;
a plurality of insert holders center said insert within said duct;
a diffuser is positioned downstream of said compressor, an opening in said housing supplying air to said inlet end, and said diffuser having an outer shroud and an inner shroud with intermediate vanes, and said outer shroud ending at a location upstream of a downstream end of said inner shroud at locations circumferentially aligned with said inlet end; and
said outer shroud only ends at the upstream location at circumferential locations associated with said inlet end, but extends further downstream at other locations.

2. The engine as set forth in claim 1, wherein said insert has rounded axial ends.

3. The engine as set forth in claim 1, wherein said duct includes a plurality of ducts, each of said ducts having inlet ends at locations spaced by at least 90° about a cross-sectional center axis of the gas turbine engine.

4. The engine as set forth in claim 3, wherein said inlet ends are spaced by 180°.

5. The engine as set forth in claim 1, wherein a flow path through said opening, and into said inlet end of said duct has at least a portion formed with a part-circular radius.

6. The engine as set forth in claim 5, wherein said opening in said housing leads into said inlet end of said duct, with said inlet end ending downstream of said opening in said housing, with said part-circular radius portion formed in said housing.

7. The engine as set forth in claim 1, wherein said opening is formed through said housing and into said inlet end of said duct wherein a flow path through said opening, and into said inlet end of said duct has at least a portion formed with a part-circular radius.

8. The engine as set forth in claim 7, wherein said opening in said housing leads into said inlet end of said duct, with said inlet end ending downstream of said opening in said housing, with said part-circular radius portion formed in said housing.

9. A gas turbine engine comprising:
a compressor delivering air into a combustion section having a combustor, and said combustion section and said compressor being housed in a housing, an air supply system communicating through said housing to deliver air from a location between an upstream end of said compressor, and an upstream end of said combustor;
said air supply system having a duct with a duct inlet end and extending to an outlet end, said duct being provided with a central insert at an upstream end, said central insert providing a venturi effect by reducing the cross-sectional flow between the insert and an inner wall of the duct at the upstream end, and said insert and duct providing increased cross-sectional flow areas at downstream locations, said insert ending within said duct upstream of said outlet end;
said air supply system includes a plurality of said ducts, each of said ducts being provided with an insert, and said ducts inlet ends at locations spaced by at least 90° about a cross-sectional center axis of the gas turbine engine;
a diffuser positioned downstream of said compressor, an opening in said housing supplying air to said duct inlet ends, and said diffuser having an outer shroud and an inner shroud with intermediate vanes, and said outer shroud ending at a location upstream of a downstream end of said inner shroud at locations circumferentially aligned with said duct inlet end, said outer shroud only ends at the upstream location at circumferential locations associated with said duct inlet end, but extends further downstream at other locations; and
a flow path through said opening, and into said inlet end of said duct has at least a portion formed with a part-circular radius.

10. A gas turbine engine comprising:
a compressor delivering air into a combustion section having a combustor, and said combustion section and said compressor being housed in a housing, an air supply system communicating through said housing to deliver air from a location between an upstream end of said compressor, and an upstream end of said combustor;

said air supply system having a duct with an inlet end;

a diffuser positioned downstream of said compressor, and said diffuser having an outer shroud and an inner shroud with intermediate vanes, and said outer shroud ending at a location upstream of the downstream end of said inner shroud at locations circumferentially aligned with said inlet end; and said outer shroud only ends at the upstream location at circumferential locations associated with said inlet ends, but extends further downstream at other locations.

\* \* \* \* \*